US009942593B2

(12) United States Patent
Kaburlasos et al.

(10) Patent No.: US 9,942,593 B2
(45) Date of Patent: Apr. 10, 2018

(54) PRODUCING DECODED AUDIO AT GRAPHICS ENGINE OF HOST PROCESSING PLATFORM

(75) Inventors: Nikos Kaburlasos, Lincoln, CA (US);
Scott W. Cheng, Folsom, CA (US);
Hong Jiang, El Dorado Hills, CA (US);
Michael D. Stoner, Folsom, CA (US);
Narayan Biswal, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1014 days.

(21) Appl. No.: 13/024,536

(22) Filed: Feb. 10, 2011

(65) Prior Publication Data

US 2012/0209614 A1    Aug. 16, 2012

(51) Int. Cl.
| | |
|---|---|
| *G10L 19/022* | (2013.01) |
| *G10L 21/055* | (2013.01) |
| *H04N 21/4143* | (2011.01) |
| *H04N 21/426* | (2011.01) |
| *H04N 19/44* | (2014.01) |
| *H04N 19/42* | (2014.01) |

(52) U.S. Cl.
CPC ......... *H04N 21/4143* (2013.01); *H04N 19/42* (2014.11); *H04N 19/44* (2014.11); *H04N 21/42607* (2013.01); *H04N 21/42653* (2013.01)

(58) Field of Classification Search
CPC ..... G10L 19/02; G10L 19/002; G10L 21/055; G10L 21/057; G10L 19/022
USPC .............. 704/200, 203, 211, 230, 500, 501; 348/515; 712/32, 34
See application file for complete search history.

(56) References Cited

U.S. PATENT DOCUMENTS

| | | | | |
|---|---|---|---|---|
| 5,630,005 | A | * | 5/1997 | Ort ................................ 386/351 |
| 6,124,895 | A | * | 9/2000 | Fielder .......................... 348/515 |
| 6,208,276 | B1 | * | 3/2001 | Snyder .................... G10L 19/26 341/123 |
| 6,275,239 | B1 | | 8/2001 | Ezer et al. |
| 6,342,892 | B1 | | 1/2002 | Van Hook |

(Continued)

FOREIGN PATENT DOCUMENTS

| | | |
|---|---|---|
| CN | 1414793 A | 4/2003 |
| CN | 101106714 A | 1/2008 |

(Continued)

OTHER PUBLICATIONS

PCT/US2011/066340 Search Report with Written Opinion of the International Searching Authority dated May 29, 2012 (8 pgs).
Japanese Patent Office, Japanese Office Action in issued in corresponding JP Application No. 2013-552523 dated Jul. 7, 2014 [English translation] (2 pages).
France, M., Audio Signal Processing Using Programmable Graphics Hardware, Game Programming Gems 7, Born Digital, Inc., Dec. 25, 2008, First Impression of the First Edition, p. 279-283
Extended European Search Report dated Nov. 14, 2014 by the European Patent Office in Application No. 11858139.6 (5 pgs).

(Continued)

*Primary Examiner* — Martin Lerner
(74) *Attorney, Agent, or Firm* — Trop Pruner & Hu, P.C.

(57) ABSTRACT

Techniques are disclosed that involve the processing of audio streams. For instance, a host processing platform may receive a content stream that includes an encoded audio stream. In turn, a graphics engine produces from it a decoded audio stream. This producing may involve the graphics engine performing various operations, such as an entropy decoding operation, an inverse quantization operation, and an inverse discrete cosine transform operation. In embodiments, the content stream may further include an encoded video stream. Thus the graphics engine may produce from it a decoded video stream. This audio and video decoding may be performed in parallel.

17 Claims, 5 Drawing Sheets

(56) References Cited

U.S. PATENT DOCUMENTS

| | | | |
|---|---|---|---|
| 7,130,528 B2* | 10/2006 | Blair et al. | 386/344 |
| 7,158,141 B2 | 1/2007 | Chung et al. | |
| 7,222,068 B2* | 5/2007 | Leaning | G10L 19/24 704/200.1 |
| 8,099,407 B2* | 1/2012 | Auerbach et al. | 707/709 |
| 8,613,038 B2* | 12/2013 | Bansal et al. | 725/151 |
| 2003/0206727 A1* | 11/2003 | Sawabe et al. | 386/96 |
| 2006/0198528 A1* | 9/2006 | Tuffy et al. | 381/23 |
| 2008/0027719 A1* | 1/2008 | Kirshnan | G10L 19/20 704/214 |
| 2008/0289479 A1* | 11/2008 | Matsuhashi | G10L 19/00 84/604 |
| 2009/0037189 A1* | 2/2009 | Jung | G10L 19/008 704/500 |
| 2009/0157394 A1* | 6/2009 | Singhal | 704/205 |
| 2010/0073212 A1* | 3/2010 | Feng | 341/144 |
| 2010/0295993 A1* | 11/2010 | Oh | 348/516 |
| 2011/0218797 A1* | 9/2011 | Mittal | G10L 19/18 704/200 |

FOREIGN PATENT DOCUMENTS

| | | |
|---|---|---|
| JP | H9-325759 | 12/1997 |
| JP | 2008-104153 | 5/2008 |

OTHER PUBLICATIONS

Chen, X., et al., "Design and Implementation of MPEG Audio Layer III Decoder using Graphics Processing Units," Image Analysis and Signal Processing (IASP), 2010 International Conference on IEEE, Piscataway, NJ, Apr. 9, 2010, pp. 484-487 (4 pages).

CN office action in corresponding CN application No. 201180067236.1 dated Nov. 27, 2015.

CN office action in corresponding CN application No. 201180067236.1 dated Aug. 3, 2016.

EP office action in corresponding EP application No. 11858139.6 dated Jan. 21, 2016.

EP office action in corresponding EP application No. 11858139.6 dated Nov. 24, 2016.

JP office action in corresponding JP application No. 2013-552523 dated Mar. 31, 2015.

KR office action in corresponding KR application No. 10-2013-7021002 dated Feb. 2, 2015.

KR office action in corresponding KR application No. 10-2013-7021002 dated Aug. 4, 2015.

KR office action in corresponding KR application No. 10-2013-7021002 dated Oct. 6, 2015.

TW office action in corresponding TW application No. 100145054 dated Oct. 29, 220014.

TW office action in corresponding TW application No. 100145054 dated Jan. 18, 2017.

* cited by examiner

PRODUCING DECODED AUDIO AT GRAPHICS ENGINE OF HOST PROCESSING PLATFORM

BACKGROUND

Many computing platforms include a host central processing unit (CPU) (also referred to herein as a host) to perform various processing operations associated with user applications. Such applications may involve the decoding and output (rendering) of media, such as video and/or audio streams.

With respect to video, a host typically relies on a graphics engine to perform operations involving the decoding and rendering of video. However, for audio, the host typically performs operations involving its decoding and rendering. Although dedicated hardware audio codecs (encoder/decoders) may be employed, they add considerable expense.

Unfortunately, the processing of audio streams by the host is not very power efficient. For instance, audio processing cannot typically be done in more than 2 or 4 threads in typical client platforms.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques involving the processing of audio streams. For instance, a host processing platform may receive a content stream that includes an encoded audio stream. In turn, a graphics engine produces from it a decoded audio stream. This producing may involve the graphics engine performing various operations, such as an entropy decoding operation, an inverse quantization operation, and an inverse discrete cosine transform operation. In embodiments, the content stream may further include an encoded video stream. Thus the graphics engine may produce from it a decoded video stream. This audio and video decoding may be performed in parallel.

Graphics engines provide hardware acceleration for the performance of operations associated with video codecs. For example, a graphics processing unit (GPU) provides hardware acceleration that may be employed to implement multiple types of video codecs. Examples of such codecs include (but are not limited to) h.264, mpeg2, vc-1, and so forth. However, video codecs do not currently process audio streams. Instead, as described above, the processing of audio streams is typically handled by a host. Unfortunately, this approach may consume excessive amounts of power.

In embodiments, however, graphics engines may be employed to process audio streams. As a result, a complete media (video and audio) processing platform may be provided to independent software vendors (ISVs).

Also, the employment of graphics engines to process audio streams may advantageously reduce host CPU power dissipation in media playback scenarios. For instance, lossless high definition (HD) audio streams have high bit rates (in the 3-6 Mbps range on average, but they can reach peak rates of 15-20 Mbps). Processing such audio streams requires a considerable amount of CPU cycles and power consumption. More particularly, lab measurements have shown that roughly 0.5 Watts of CPU power, during Blu-ray disc playback, can be attributed to audio processing.

Even though audio streams are fundamentally quite different in nature from video streams, they have a number of similarities that embodiments exploit. For instance, both video and audio streams are often compressed through a variable length decoding (VLD) scheme, such as Huffman compression. Also, both video and audio streams are often quantized at the encoder and inverse-quantized at the decoder. Moreover, both video and audio streams are often transformed using a discrete cosine (DCT) transform at the encoder and then reverse-transformed via an inverse DCT (iDCT) transform at the decoder.

Embodiments may leverage these similarities to provide a unified video/audio processing environment that may process both video and audio streams. Moreover, audio coder/decoders (codecs) can often be quite threadable (even though the degree of threadability may vary from one audio codec to another). This may advantageously facilitate a graphics engine that processes audio together with video as a unified video/audio parallel execution engine. The performance of audio processing on the graphics engine may advantageously be faster and more power efficient.

Figure 1:
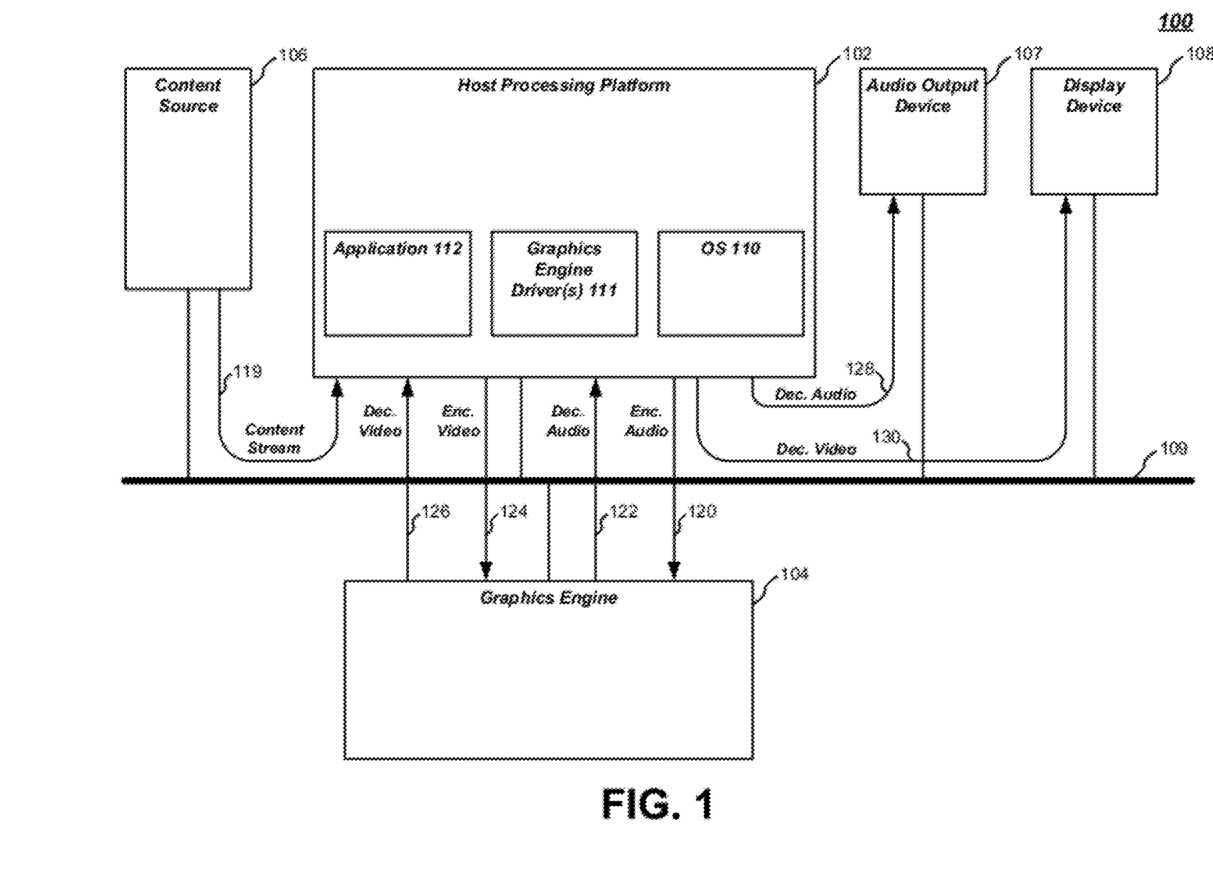
FIG. 1 is a diagram of an exemplary apparatus.

FIG. 1 is a diagram of an exemplary operational environment 100, which may employ the techniques described herein. Environment 100 may include various elements. For instance, FIG. 1 shows environment 100 including a host processing platform 102, a graphics engine 104, a content source 106, audio output device (s) 107, a display device 108, and an interface 109. These elements may be implemented in any combination of hardware and/or software.

Host processing platform 102 may be implemented with one or more processors (e.g., microprocessors), such as a central processing unit (CPU). Host processing platform 102 may execute various processes and applications. As shown in FIG. 1, host processing platform 102 executes an operating system (OS) 110. Through this operating system, various applications and processes may be executed. For example, FIG. 1 shows processing platform 102 executing a media application, 112. and one or more graphics engine drivers 111.

Application 112 may perform operations involving audio and/or video (or graphics). For instance, application 112 may be a media application that receives encoded content (e.g., encoded audio and/or video content). This content may be received from content source 106.

In embodiments, graphics engine driver(s) 111 include software executed by host processing platform 102. Driver(s) 111 may allow processes, such as application 112 to interact with graphics engine 104. This may involve application 112 invoking calls or routines provided by driver(s) 111. As described herein, such routines may involve the decoding of audio streams, as well as video streams. In turn, driver(s) 111 may issue commands to graphics engine 104. In response, graphics engine 104 may provide resulting data to application 112 (e.g., via drivers 111).

In embodiments, content source 106 may include an optical storage medium, such as a digital video disc (DVD), Blue-ray, and/or compact disc (CD) reader, which provides encoded audio and/or video data from one or more loaded discs. Additionally or alternatively, content source 106 may include a magnetic or electronic storage medium (such as a magnetic disk drive or a solid state drive) that stores encoded content. Embodiments, however, are not limited to these examples of storage media.

Further, content source 106 may include a communications interface to receive encoded content from a wired or wireless communications medium. Examples of communications media include (but are not limited to) local area networks (LANs), wireless LANs (WLANs), personal area networks (PANs), wireless metropolitan area networks (WMANs), cellular telephony networks, cable broadcast systems, terrestrial or satellite video broadcasting networks (e.g., DVB networks), and so forth. Upon receipt of such content, application 112 operates to decode such content so that it may outputted by one or more devices.

In embodiments, graphics engine 104 is provided by a graphics processing unit (GPU). More particularly, graphics engine 104 provides acceleration for a number of functions that are often required in video and audio processing (Huffman decode, iDCT etc). This GPU may include one or more specialized microprocessors that offloads and accelerates video and graphics rendering from host processing platform 102. Also, graphics engine 104 may include multiple parallel execution units (EUs) that can support multi-threaded and parallel processing. Graphics engine 104 may include a commercially available graphics engine manufactured by Intel Corporation of Santa Clara, Calif. Embodiments, however, are not limited to this example.

In general operation, graphics engine 104 may provide, for application 112, operations associated with video decoding. Such operations may include (but are not limited to) variable length decoding (VLD), inverse quantization, and inverse discrete cosine transform (DCT) operations. Graphics engine 104 may provide specialized hardware and/or memory to perform such operations quickly and efficiently.

Such operations are also common to audio decoding. Thus, in addition to performing video decoding operations, graphics engine 104 may perform audio decoding operations for application 112. Such audio decoding may be in accordance with various codecs. Exemplary codecs include (but are not limited to) DTS-HD Master Audio, Dolby TrueHD, MP3, AAC etc. However, any audio codec may be employed. In embodiments, the performance of such audio and video decoding operations may be initiated by application 112 through graphics engine driver(s) 111.

Audio output device (s) 107 may include one or more speakers to generate acoustic signals from audio streams received from host processing platform 102 and/or graphics engine 104. In embodiments, such audio streams may be digital pulse-code modulation (PCM) signals. Thus audio output device(s) may further include components, such as an analog to digital converter (ADC) and filter(s) to convert these digital signals into an analog signal for the speaker(s). Further components may include amplifiers, user controls (e.g., volume, tone, equalization, balance, and so forth). Such components of audio output device(s) 107 may be implemented in any combination of hardware and/or software.

Display device 108 includes a physical display that provides a visual output to a user. This output may be in the form of sequential images (or frames). Exemplary physical displays include light emitting diode (LED) displays, liquid crystal displays (LCDs), plasma displays, and cathode ray tube (CRTs). Embodiments, however, are not limited to these examples. Each of the frames output by display device 108 may comprise multiple pixels. Data representing these pixels (e.g., color and/or intensity values) may be stored in one or more frame buffers within display device 108. This data may be referred to as "frame data". Such frame buffer(s) may be provided by a storage such as volatile random access memory (RAM) (e.g. dynamic RAM). However, other types of storage media, such as non-volatile memory, may be employed.

Interface 109 provides for couplings among the elements of FIG. 1. For instance, interface 109 may include one or more point-to-point connections (e.g., parallel interfaces, serial interfaces, dedicated signal lines, etc.) between various pairings of elements.

Additionally or alternatively, interface 109 may include a multi-drop or bus interface. Exemplary bus interfaces include Universal Serial Bus (USB) interfaces, as well as various computer system bus interfaces.

Further, interface 109 may include one or more software interfaces (e.g., application programmer interfaces, remote procedural calls, shared memory, etc.) that provide for the exchange of data between software processes.

In embodiments, the elements of FIG. 1 may be implemented within a computer system. Such a computer system may be a personal computer (e.g., a desktop, laptop, notebook, or tablet computer). Alternatively, such a computer system may be a handheld device, such as a mobile phone, personal digital assistant (PDA), mobile phone smart phone, or portable media player. Embodiments, however, are not limited these examples.

As described above, the elements of FIG. 1 may include one or more processors (e.g., microprocessors). For instance, processing platform 102 and graphics engine 104 may be implemented with one or more processors. As an example, host processing platform 102 may be implemented with one or more CPUs and/or graphics engine 104 may be implemented with one or more GPUs. These CPU(s) and/or GPU(s) may operate in accordance with instructions (e.g., software) stored in one or more storage media. Some or all of such storage media may be included in processing platform 102 and/or graphics engine 104. Additionally or alternatively, some or all of such storage media may be external to processing platform 102 and graphics engine 104. Such storage media may include memory (volatile or non-volatile), disk storage, optical storage, etc.

Host processing platform 102 and graphics engine 104 may be implemented with respective cores in a multi-core processor. Thus, these elements may be together within an integrated circuit.

An exemplary sequence of operations is now described. As shown in FIG. 1, host processing platform 102 may receive a content stream 119 from content source 106. In embodiments, content stream 119 includes an encoded audio stream. Additionally, content stream 119 may include an encoded video stream.

Application 112 (which is executing on host processing platform 112) may receive content stream 119. This reception may be directly, or through one or more intermediate processing elements. Such processing elements may include (but are not limited to) any combination of OS 110, graphics engine driver(s) 111, application programmer interfaces (APIs), and so forth.

From content stream 119, application 112 extracts and provides to graphics engine 104 an encoded audio stream 120 and an encoded video stream 124. In turn, graphics engine 104 performs various operations on these streams. As a result, graphics engine 104 produces decoded audio stream 122 and decoded video stream 126. In embodiments, graphics engine 104 may process these audio and video streams in parallel.

The operations performed by graphics engine 104 may be initiated by host processing platform 102. For instance, application 112 may cause directives to be sent to graphics engine 104. Such directives may be sent through driver(s) 111.

FIG. 1 shows that decoded audio stream 122 and decoded video stream 126 are provided to host processing platform 102. Upon receipt, further operations may be performed, such as audio/video synchronization and buffering to output stack(s) maintained by OS 110. Following, such operations, corresponding decoded audio stream 128 and corresponding decoded video stream 130 are provided to audio output device 107 and display device 108, respectively.

As described herein, audio stream processing and video stream processing have similar characteristics. Details regarding the processing of audio streams are now provided. Audio samples are typically transformed (lossily) into a number of frequency subband coefficients (for example, 32 or 64 coefficients). For a number of audio samples, these subband coefficients are (in increasing time order) packed together to form an audio frame.

Figure 2:
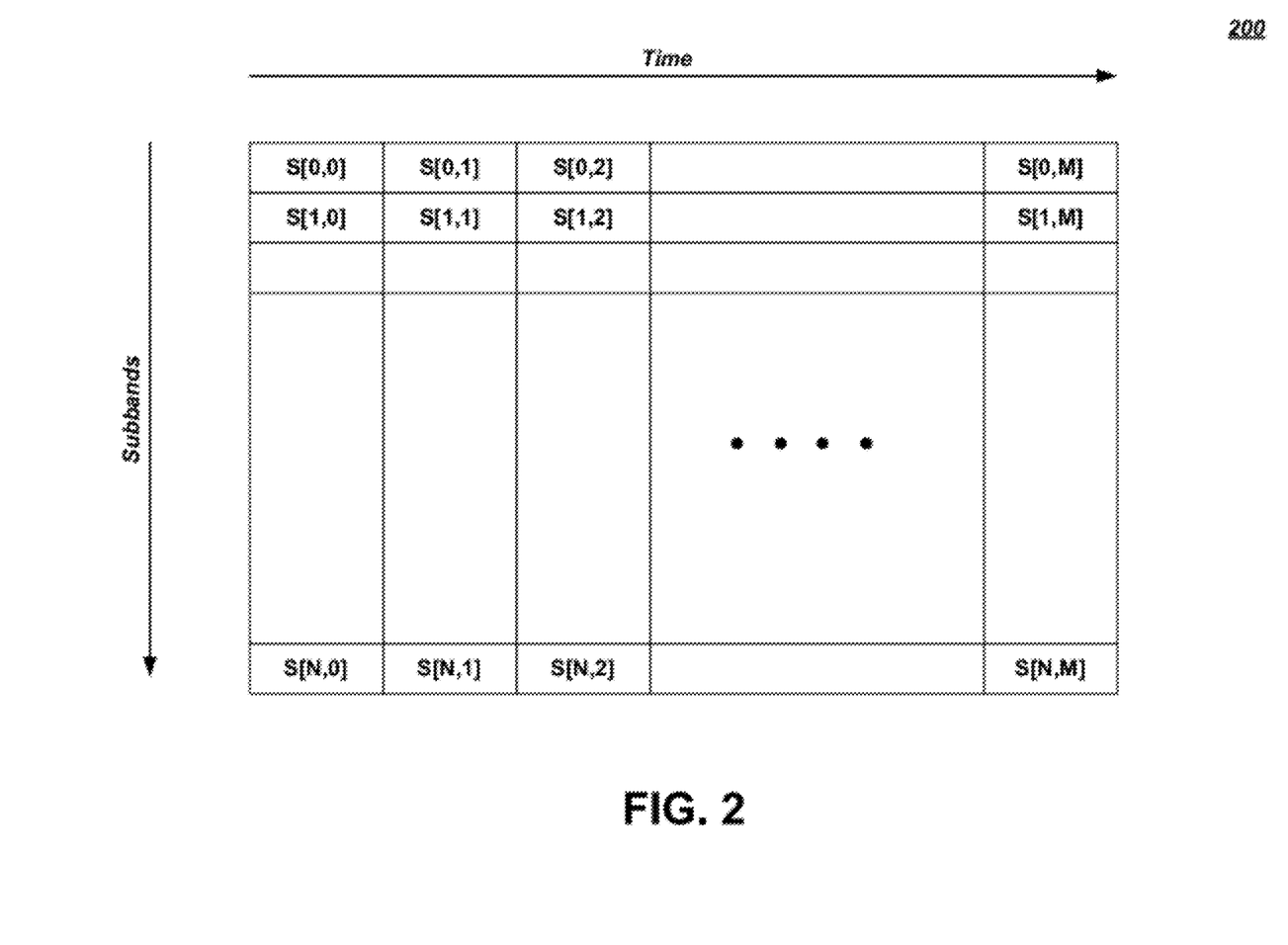
FIG. 2 is a diagram of an exemplary audio frame.

FIG. 2 is a diagram of an exemplary audio frame 200. This diagram is arranged horizontally in columns according to time, and vertically in rows according to subband. Thus, the diagram provides a two dimension matrix of values. Each of these values is a subband coefficient of an audio sample More particularly, the subband coefficients in a particular column belong to the same audio sample, which was decomposed to N subbands (typically N=32 or 64). Subsequent columns (i.e., columns to the right) in the audio frame represent audio samples encoded in subsequent moments in time. Thus, the audio sample in column #1 was encoded first, followed by the next audio sample in column #2, followed by the next audio sample in column #3, and so forth. Therefore, FIG. 2 shows that the subband coefficients of M audio samples were packed together to form a single audio frame.

A lossless audio stream often includes a lossy core, which is composed of frames such as the one shown in FIG. 2. Further, a lossless audio stream may include an additional residual stream. This residual stream enables a decoder to achieve a bit-accurate reproduction of the original audio stream.

It is apparent from FIG. 2 that an audio frame resembles a video frame, except the horizontal and vertical (x,y) coordinates of each sample in the audio frame do not represent spatial coordinates of a pixel. Rather these coordinates represent the frequency (subband) and time coordinates of an audio sample.

Figure 3:
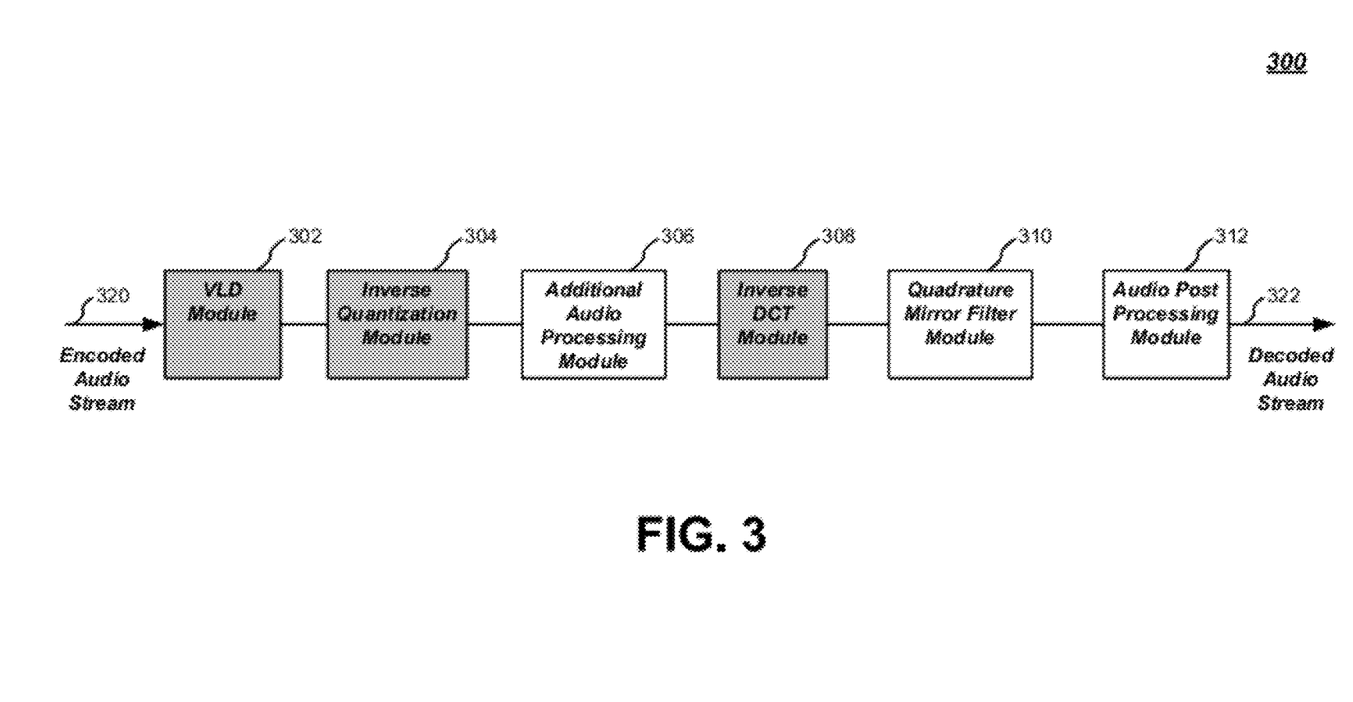
FIG. 3 is a diagram of an exemplary audio stream decoding pipeline.

FIG. 3 is a diagram of an exemplary lossy audio stream decoding pipeline 300. As shown in FIG. 3, this pipeline includes a variable length decoding (VLD) module 302, an inverse quantization (inverse Q) module 304, an additional audio processing module 306, an inverse DCT (iDCT) module 308, a quadrature mirror filter (QMF) module 310, and an audio post processing module 312. These modules may be implemented in any combination of hardware and/or software. Moreover, the modules of FIG. 3 are presented as an example, and not as a limitation. Thus, depending on specific codec characteristics, this audio pipeline may include additional or fewer modules.

In general operation, pipeline 300 receives an encoded (compressed) audio stream 320 and generates a corresponding decoded audio stream 322. More particularly, FIG. 3 shows VLD module 302 receiving compressed audio stream 320. In turn, VLD module 302 performs entropy decoding on this stream. This decoding may be Huffman decoding. Embodiments, however, are not limited to this example. The results of this decoding are inverse-quantized by inverse Q module 304.

Module 306 may perform additional audio processing on the inverse quantization results of module 304. As an example, module 306 may perform inverse adaptive differential pulse-code modulation (ADPCM) on these results. However, additional and/or alternative operations may be performed. In embodiments, this audio processing may (depending on the specifics of the particular audio codec) be threadable across multiple subbands and/or audio samples (e.g., across the rows and/or columns of the frame shown in FIG. 2).

For audio codecs that employ DCT transforms, inverse DCT module 308 performs an inverse DCT on the output of module 306. Following this, QMF module 310 converts frequency domain coefficients provided by module 308 into pulse-code modulation (PCM) audio samples in the time domain. In embodiments, QMF module 310 performs operations that are typically threadable across subbands (e.g., rows in FIG. 2), but not necessarily across audio samples (e.g., columns in FIG. 2).

Often, inverse DCT and QMF operations performed by modules 308 and 310 are the most computationally intensive operations in the audio pipeline. For instance, when combined, these operations may represent 30-50% of the total million instructions per second (MIPS) consumed.

As shown in FIG. 3, audio post-processing module 312 may perform operations on the PCM samples provided by QMF module 310. As exemplary operation includes downmixing (reducing the number or audio channels in the audio stream). However, alternative and/or additional operations may be performed. This produces decoded audio stream 322, which may be sent to output device(s), such as amplifier(s) and/or speaker(s).

The pipeline of FIG. 3 may be applied separately to each of multiple audio channels (e.g., two, five or more audio channels). Thus each channel may be processed independently. However, embodiments are not limited to such independent processing.

Certain modules of FIG. 3 are also common to video pipelines. For instance, VLD module 302, inverse Q module 304, and inverse DCT module 306 may be employed in video pipelines. Thus, in FIG. 3, these modules are shaded in gray. As a result of such commonalities, embodiments may submit an audio frame to a video pipeline, in order to have the indicated operations (VLD, Inverse Q, iDCT, etc) performed on it.

Moreover, audio processing operations which are not directly supported by a graphics engine (e.g., graphics engine 104) are in many cases very threadable. Thus, such operations may be executed by the graphics engine's multiple execution units. Further, in cases where audio channels can be processed independently, the degree of threadability increases. Such threadablity may be supported by the graphics engine's multiple execution units.

Figure 4:
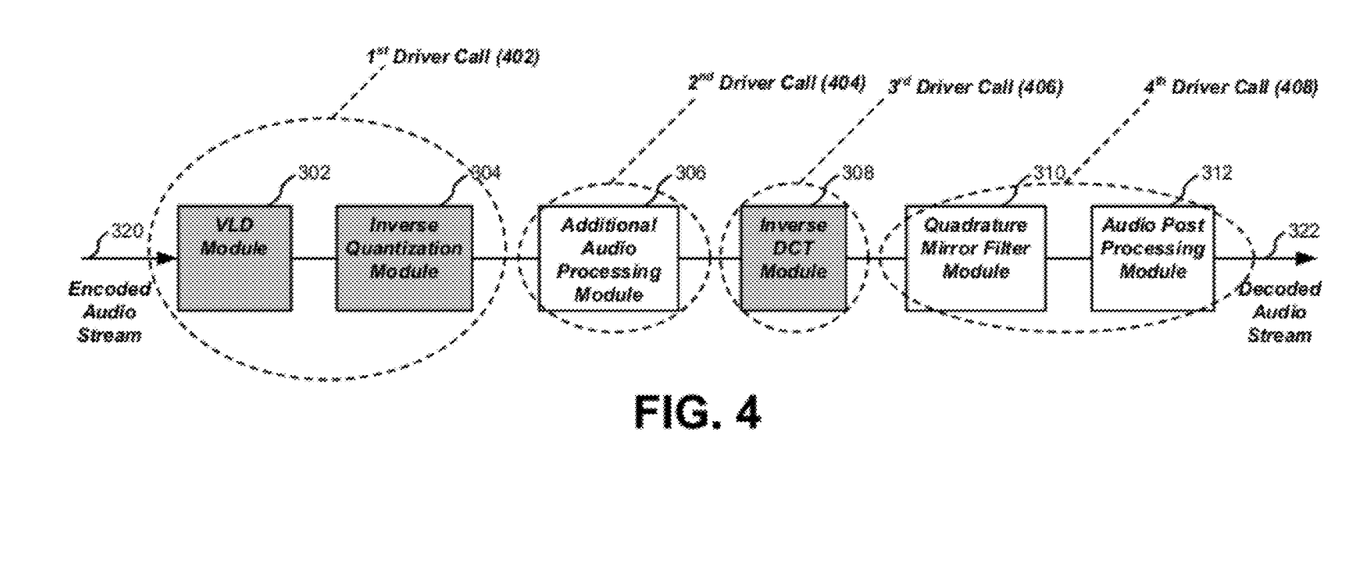
FIG. 4 is a diagram showing graphics driver calls corresponding to an audio pipeline.

To process an audio frame, using a video pipeline provided by a graphics engine, a media application may perform a number of calls to a graphics driver (e.g., graphics engine driver(s) 111 of FIG. 1). The exact number and nature of the different driver calls may be implementation specific. For example, such driver calls may depend on the particular audio codec being employed (e.g., DTS-HD Master Audio, Dolby TrueHD, etc.). FIG. 4 provides an example of such driver calls.

In particular, FIG. 4 is diagram showing graphics driver calls corresponding to the audio pipeline modules of FIG. 3. These driver calls are provided for purposes of illustration and not limitation. Thus, and combination of fewer or greater calls may be employed.

FIG. 4 shows a first driver call 402 that invokes the operations of modules 302 and 304, and a second driver call 404 that invokes the operations of module 306. Also, a third driver 406 call invokes the operations of module 308. Moreover, a fourth driver call 408 invokes the operations of modules 310 and 312. These driver calls are provided for purposes of illustration, and not limitations. Thus other arrangements of fewer or greater driver calls may be employed. For example, embodiments may employ an optimized implementation in which many driver calls are merged, so as to reduce the number of application/driver interactions required to process each audio frame.

Figure 5:
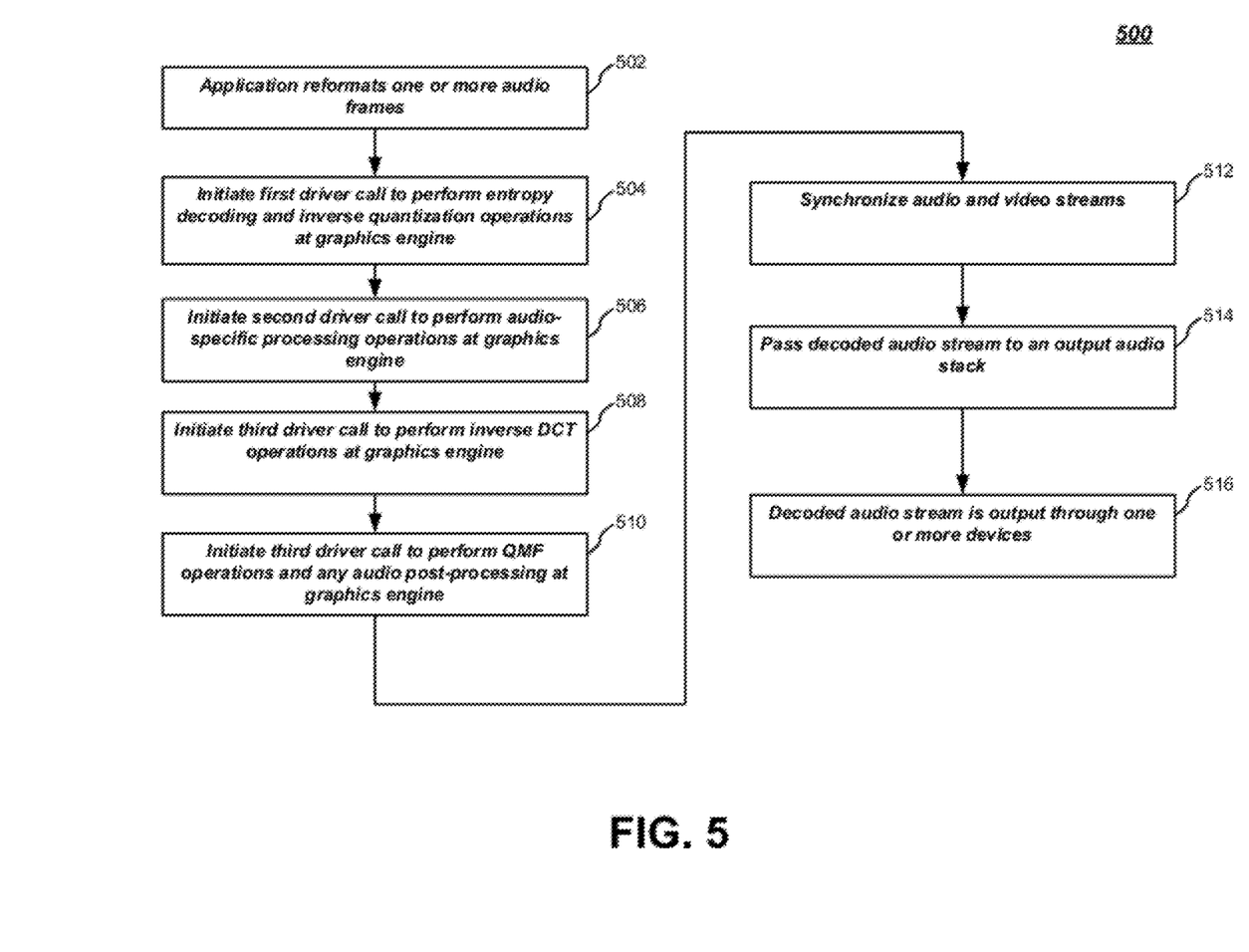
FIG. 5 is a logic flow diagram.

FIG. 5 illustrates an exemplary logic flow 500, which may be representative of operations executed by one or more embodiments described herein. Although FIG. 5 shows particular sequences, other sequences may be employed. Moreover, the depicted operations may be performed in various parallel and/or sequential combinations.

At a block 502, an application reformats one or more audio frames so that their format is compatible to that of a video frame. In embodiments, this may comprise combining multiple audio frames into a single larger frame. Alternatively or additionally, this may comprise changing the dimensions of the audio frame(s) in time and/or frequency. For example, additional subbands and/or time samples may be "zero padded" onto the audio frame to make it a video compliant size.

At a block 504, a first graphics driver call is performed. This call submits the audio frame to the graphics engine (e.g., graphics engine 104) for entropy decoding and inverse-quantization (e.g., as performed by modules 302 and 304). In embodiments, the graphics engine has fixed functions and/or programmable VLD engines that may perform these operations.

At a block 506, a second driver call is performed. This call initiates to performance of other audio-specific processing (e.g., processing of module 306). As described above, such processing may be very threadable across subbands, audio samples and audio channels. As a result, a high degree of threadability may be achieved. This allows for a fast, efficient execution by the graphics engine's execution units.

A third driver call is performed at a block 508. In this driver call, the application may submit the audio frame to the graphics engine so that an inverse-DCT may be performed on it. As described herein, the graphics engine has fixed and/or programmable functions to provide acceleration for this operation.

At a block 510, a fourth driver call is performed. This call initiates execution of QMF operations and any other audio post processing (e.g., operations of modules 310 and 312). As described above, these operations may be very threadable (the degree of threadability may vary from one audio codec scheme to another). Thus, these operations may be good candidates for multi-threaded execution on the graphics engines execution units.

Performance of block 510 produces decoded audio. Accordingly, if this audio accompanies a video stream, the video stream and audio stream may be synchronized (e.g., aligned in time) at a block 512. In embodiments, such synchronization may be performed by the application.

At a block 514, the application may pass the decoded audio stream to an output audio stack. This stack may provide output buffering capacity. In turn, the audio is output through one or more devices at a block 516. Such devices may include any combination of PCM decoder(s), filter(s), amplifier(s) and/or speaker(s).

Each audio frame typically represents a fixed amount of time (e.g., 5 or 10 milliseconds, depending on the size of the audio frame). Thus, the application may submit audio frames to the graphics pipeline at a corresponding fixed rate. Accordingly any combination of blocks 502-516 may be performed repeatedly.

Also, in embodiments, the application may mix/overlap the audio processing graphics driver calls described herein with regular graphics driver calls. Thus, audio frames and video frames may be decoded and post-processed by the graphics engine in parallel.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, the techniques described herein are not limited to using binary numbers. Thus, the techniques may be employed with numbers of any base.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
receiving a content stream at a decoder, the content stream including an encoded audio stream comprising audio frames;
combining more than one encoded audio frame in said encoded audio stream into a single larger encoded audio frame to form a modified encoded audio stream such that frame boundaries of said audio encoded frames go away after combining encoded audio frames to form a larger encoded audio frame with a larger frame size; and
producing, in the decoder, a decoded audio stream from the modified encoded audio stream.

2. The method of claim 1, wherein said producing comprises:
performing an entropy decoding operation;
performing an inverse quantization operation; and
performing an inverse discrete cosine transform operation.

3. The method of claim 2, wherein the entropy decoding operation is a Huffman decoding operation.

4. The method of claim 1, wherein the modified encoded audio stream includes one or more audio frames, each audio frame including, for each of a plurality of time samples, multiple subband coefficients, the method further comprising:
formatting one or more of the audio frames to appear as an encoded image frame.

5. The method of claim 1, wherein said producing comprises placing one or more driver calls to a graphics engine.

6. The method of claim 1, wherein the content stream further includes an encoded video stream, the method further comprising:
producing a decoded video stream from an encoded video stream.

7. The method of claim 6, further comprising:
synchronizing the decoded video stream and the decoded audio stream.

8. The method of claim 6, wherein said producing the decoded audio stream and said producing the decoded video stream are performed in parallel.

9. The method of claim 1, further comprising sending the decoded audio stream to an audio output device.

10. The method of claim 1, wherein the decoded audio stream includes a digital pulse-code modulation (PCM) signal.

11. An apparatus, comprising:
a host processing platform to receive a content stream at a decoder, the content stream including an encoded audio stream comprising audio frames;
combine more than one encoded audio frame into a single larger encoded audio frame to form a modified encoded audio stream such that frame boundaries of said audio encoded frames go away after combining encoded audio frames to form a larger encoded audio frame with a larger frame size; and
a graphics engine to produce, in the decoder, a decoded audio stream from the modified encoded audio stream.

12. The apparatus of claim 11, wherein the encoded audio stream includes one or more audio frames, each audio frame including, for each of a plurality of time samples, multiple subband coefficients; and
wherein the host processing platform is to format one or more of the audio frames to appear as an encoded image frame.

13. The apparatus of claim 11, the graphics engine is to perform a plurality of operations on the encoded audio stream, the plurality of operations including an entropy decoding operation, an inverse quantization operation, and an inverse discrete cosine transform operation.

14. The apparatus of claim 11, further comprising an audio output device, and wherein the host processing platform is to send the decoded audio stream to the audio output device.

15. The apparatus of claim 11, wherein the host processing platform is included in a first processor core of a multi-core processor, and the graphics engine is included in a second processor core of the multi-core processor.

16. The apparatus of claim 11, further comprising a storage medium to store the content stream.

17. The apparatus of claim 11, wherein the content stream further includes an encoded video stream, and wherein the graphics engine is to produce a decoded video stream from the encoded video stream in parallel with the production of the decoded audio stream.

* * * * *